United States Patent
Fayolle et al.

(10) Patent No.: US 7,126,678 B2
(45) Date of Patent: Oct. 24, 2006

(54) POLARIZED LIGHTWAVE REFLECTOMETRY METHOD (POTDR)

(75) Inventors: Philippe Fayolle, Villepreux (FR); Yves Lumineau, Herblay (FR); Gregory Bouquet, Paris (FR); Vanessa Durel, Conflans Ste Honorine (FR)

(73) Assignee: Alcatel, Paris (FR)

( * ) Notice: Subject to any disclaimer, the term of this patent is extended or adjusted under 35 U.S.C. 154(b) by 379 days.

(21) Appl. No.: 10/267,778

(22) Filed: Oct. 10, 2002

(65) Prior Publication Data
US 2004/0046955 A1 Mar. 11, 2004

(30) Foreign Application Priority Data
Sep. 5, 2002 (FR) .................... 02 10968

(51) Int. Cl.
*G01N 21/00* (2006.01)
(52) U.S. Cl. ................................... 356/73.1
(58) Field of Classification Search ............ 356/73.1; 385/11, 22, 24, 123; 250/225, 216; 359/280–282, 359/494–497
See application file for complete search history.

(56) References Cited
FOREIGN PATENT DOCUMENTS

DE 19825876 A1 12/1999
EP 0433020 A2 6/2001

OTHER PUBLICATIONS

A. Galtarossa et al, "Single-End Polarization Mode Dispersion Measurement Using Backreflected Spectra Through a Linear Polarizer", Journal of Lightwave Technology, IEEE, NY, US vol. 17, No. 10, Oct. 1999 pp. 1835-1842, XP000984134.
A. Galtarossa, Polarization-Sensitive Relfectometric Techniques for PMD Measurements, XP-001035400, 25th European Conference on Optical Communication (ECOC '99). Nice, France Sep. 27-30, 1999, Sep. 26, 1999.

*Primary Examiner*—Tu T. Nguyen
(74) *Attorney, Agent, or Firm*—Sughrue Mion, PLLC

(57) ABSTRACT

A polarized lightwave reflectometry method including the steps of sending at least two polarized light signals into the optical fiber to be tested, the signals presenting a determined angular offset relative to each other so that the polarization mode dispersion coefficient remains independent of any rotation of polarization in the optical fiber under test; extracting a scalar parameter of the relative noise type for each trace obtained by back-scattering of the light signal; and estimating the polarization mode dispersion coefficient by a function having a single scalar input, which function is of the type based on exponentials and has the form $\exp(a+bP+cP^{-1})$.

15 Claims, 3 Drawing Sheets

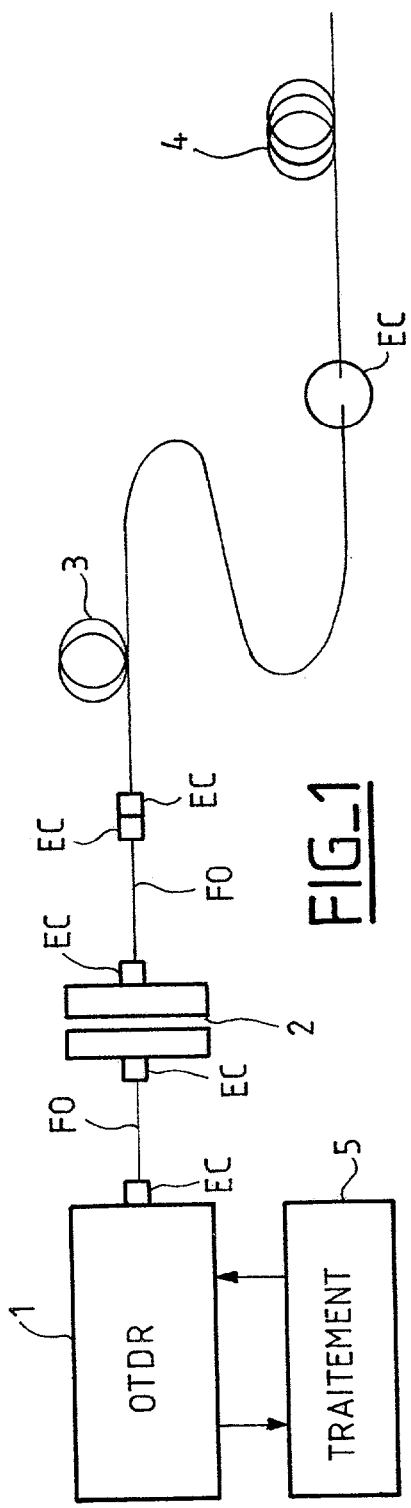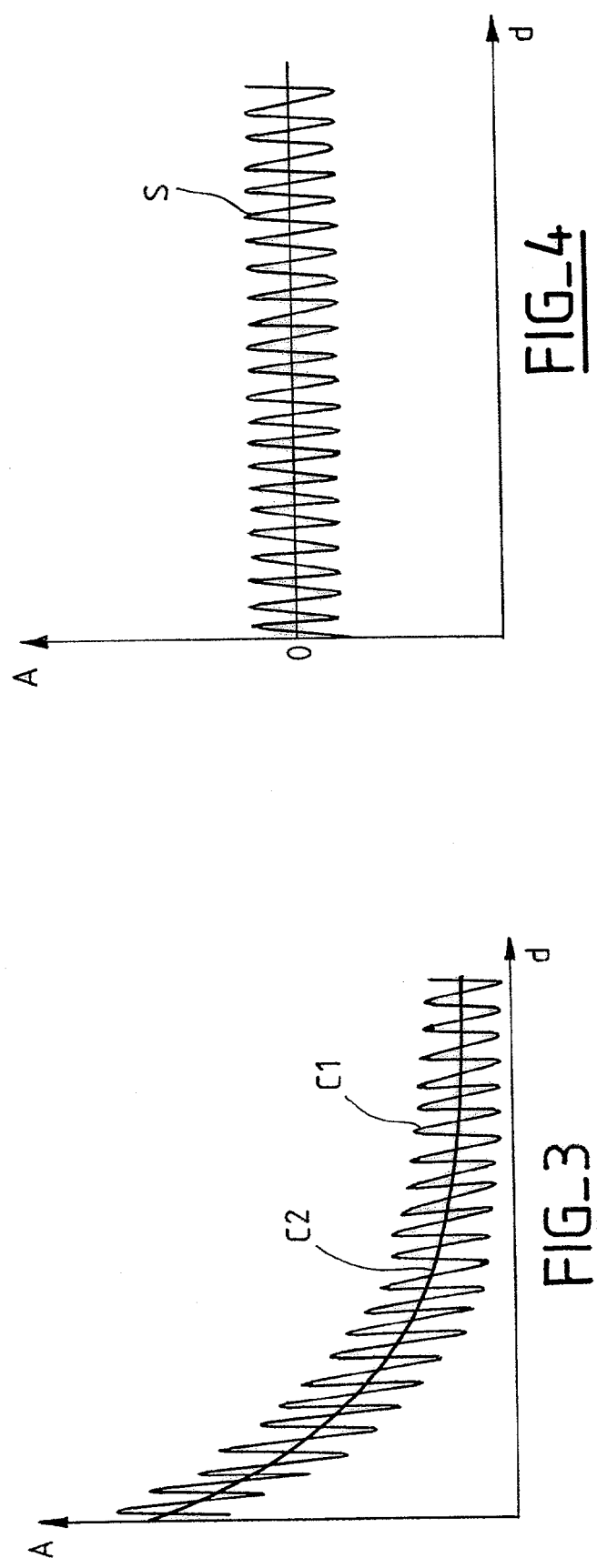

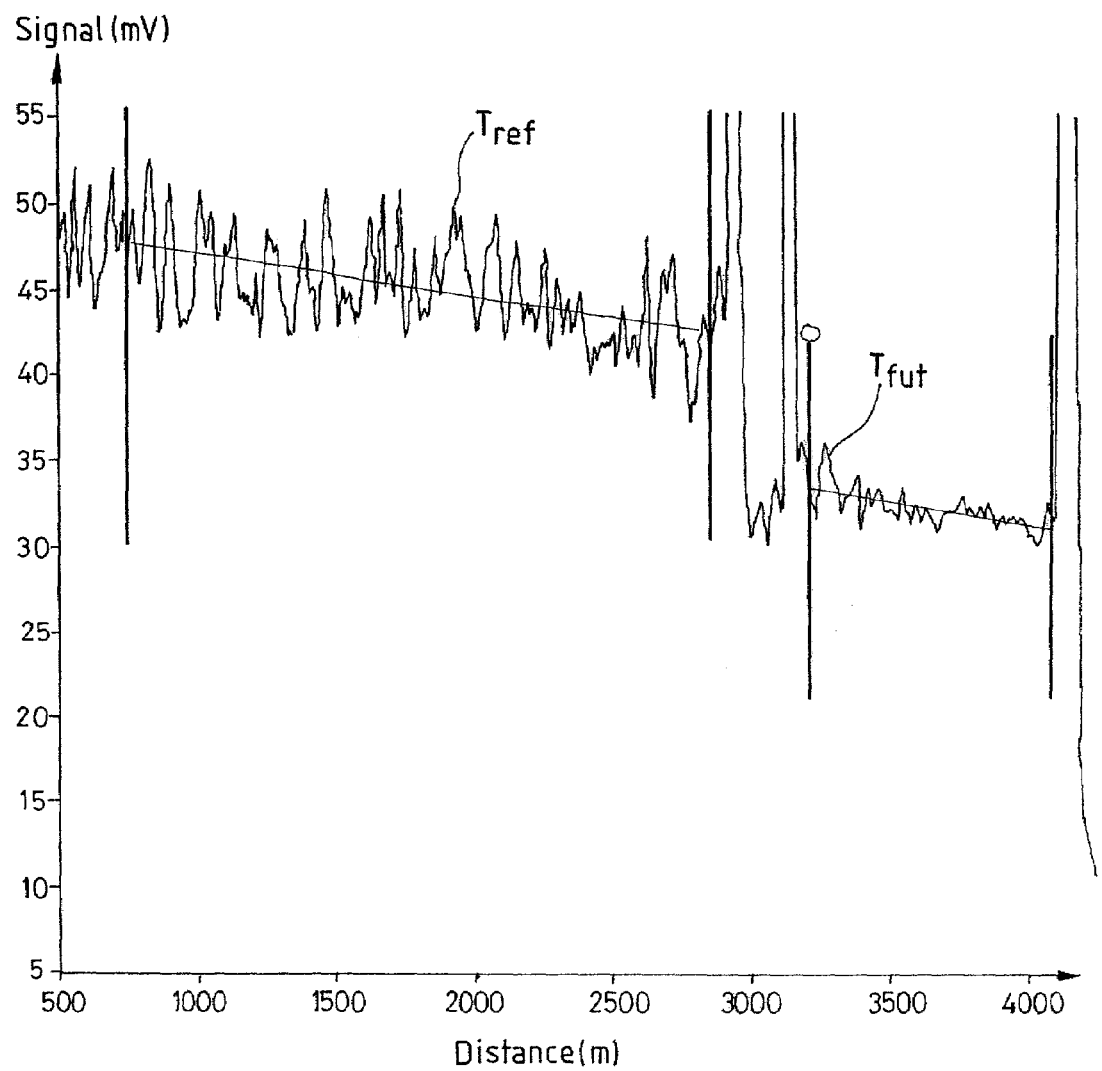
FIG_2

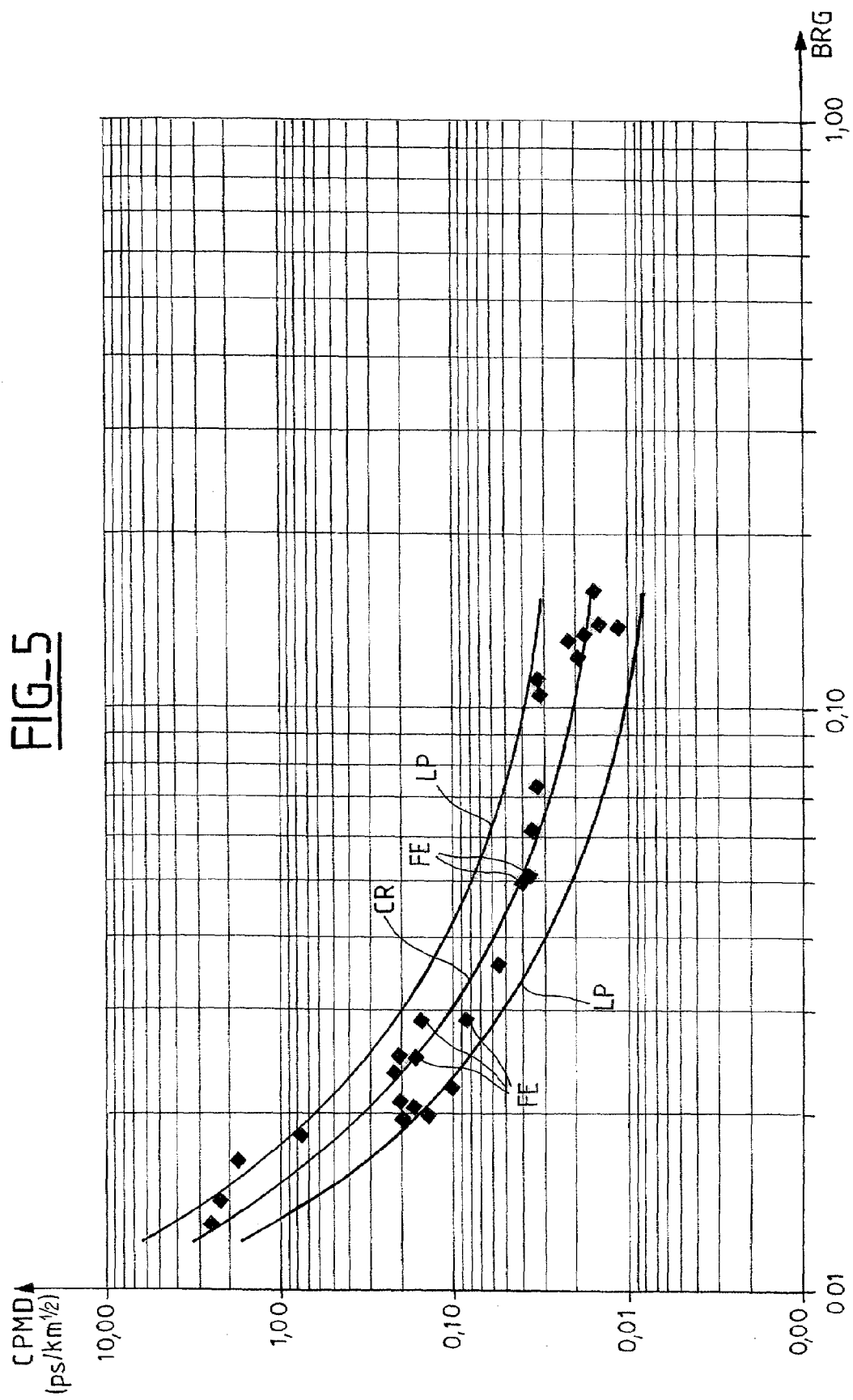
FIG_5

POLARIZED LIGHTWAVE REFLECTOMETRY METHOD (POTDR)

BACKGROUND OF THE INVENTION

The invention relates to the field of polarized lightwave reflectometry methods, also known as polarization optical time domain reflectometry (POTDR). Polarized lightwave reflectometry or POTDR makes it possible to obtain at least a qualitative estimate of the polarization mode dispersion (PMD) of optical fibers having a high degree of mode coupling, with dispersion being expressed in picoseconds per root kilometer (ps/km$^{1/2}$). POTDR makes it possible to verify uniformity of PMD along optical fibers. This makes it possible to identify and select good segments of an optical fiber (i.e. segments presenting a low PMD coefficient). Since PMD in an optical fiber is due to birefringence in said optical fiber, analyzing a polarized lightwave that has passed along an optical function makes it possible, qualitatively, to evaluate the birefringence of said optical fiber, and consequently to derive a qualitative estimate of its PMD. PMD can be evaluated either locally, i.e. over a portion of the optical fiber to be tested, said optical fiber portion preferably being at least 1 kilometer (km) long, or else overall, i.e. over the entire length of the optical fiber to be tested. Since POTDR involves a signal that has been back-scattered, it suffices to have access to one end only of the optical fiber to be tested or of the cable containing the optical fiber to be tested. It is advantageous for the PMD of an optical fiber to be uniform, known, and low.

In the prior art, e.g. as described in the article "Distributed PMD measurement with a polarization-OTDR in optical fibers" written by B. Huttener and published Mar. 10, 1999 in the "Journal of Lightwave Technology", 17, pp 1843–1948, 1999, or else in the article "Single-end polarization dispersion measurement by back-reflected spectra through a linear polarizer" written by Andrea Galtarossa and published on Oct. 10, 1999 in "Journal of Lightwave Technology", polarized lightwave reflectometry methods are known. Nevertheless, those methods are based on sending a single linearly polarized light signal from which one or more parameters are extracted, such as degree of polarization (DOP) or differential group delay (DGD) for example, from which the mode dispersion of the polarization is evaluated. The methods proposed can be described as being semi-quantitative insofar as firstly by giving a value for the polarization mode dispersion coefficient they represent a significant improvement over purely qualitative methods, and secondly their accuracy is limited and not sufficient for certain applications.

SUMMARY OF THE INVENTION

The invention proposes a polarized lightwave reflectometry method which is more accurate and which can be considered as genuinely quantitative, at least over a given range of polarization mode dispersions. For this purpose, the method of the invention may make use in particular of all or some of the following original characteristics:

instead of sending a single polarized light signal into the optical fiber to be tested, at least two polarized light signals are sent into the optical fiber to be tested, the signals presenting a determined angular offset relative to each other so that the polarization mode dispersion coefficient remains independent of any rotation of polarization in the optical fiber under test; a preferred value for the angular offset between the two linearly polarized signals being about 45 degrees;

instead of extracting scalar parameters of the DGP or DOP type from the trace obtained by back-scattering of the light signal, a scalar parameter is extracted of the relative noise type for each trace obtained by back-scattering of the light signal; and the polarization mode dispersion coefficient is estimated by means of a function having a single scalar input, which function is of the type based on exponentials and has the form $\exp(a+bP+cP^{-1})$.

The use of all of the above characteristics enables the method of the invention to be quantitative with very good accuracy over an extended range of values for polarization mode dispersion coefficient. Combining the first two characteristics is particularly advantageous and leads to a particularly advantageous compromise between accuracy and complexity.

According to an aspect of the invention, there is provided a polarized lightwave reflectometry method comprising in succession at least: a step of sending a plurality of linearly polarized light signals into an optical fiber to be tested; a polarization-sensitive step of detecting the traces obtained by the light signals back-scattering; a step of normalizing each of the traces; a step, for each of the traces, of computing over at least a portion of the optical fiber to be tested, the standard deviation of the normalized trace, the result being referred to as the relative noise of the trace; a step of computation applying a weighted average type function to the relative noise of the various traces, giving the same weight to the noise from each of the traces, the result being referred to as the overall relative noise; and a step of estimating the polarization mode dispersion coefficient from the overall relative noise by means of a function of the type having one scalar input and one scalar output; the angular offset between the linearly polarized light signals being determined in such a manner that the overall relative noise remains independent of any rotation of polarization in the optical fiber to be tested.

In another aspect of the invention, a polarized lightwave reflectometry method is provided comprising in succession at least: a step of sending a plurality of mutually distinct polarized light signals into an optical fiber to be tested; a polarization-sensitive step of detecting the traces obtained by the light signals back-scattering; a step of normalizing each of the traces; a step, for each of the traces, of computing over at least a portion of the optical fiber to be tested, the standard deviation of the normalized trace, the result being referred to as the relative noise of the trace; and a step of estimating the polarization mode dispersion coefficient from the relative noise of the traces; the polarized light signals being sufficiently distinct from one another for the polarization mode dispersion coefficient to remain independent of any rotation of polarization in the optical fiber to be tested.

In another aspect of the invention, a polarized lightwave reflectometry method is provided comprising in succession at least: a step of sending two linearly polarized light signals into an optical fiber to be tested; a polarization-sensitive step of detecting the traces obtained by the light signals back-scattering; and a step of estimating the polarization mode dispersion coefficient from the traces; the angular offset between the two linearly polarized light signals being sufficiently close to 45 degrees for the estimated polarization mode dispersion coefficient to remain independent of any rotation of polarization in the optical fiber to be tested.

In another aspect of the invention, a polarized lightwave reflectometry method is provided comprising in succession at least: a step of sending at least one polarized light signal into an optical fiber to be tested; a polarization-sensitive step of detecting the trace obtained by the light signal back-scattering; a step of calculating a scalar parameter P obtained from the trace or traces; and a step of estimating the polarization mode dispersion coefficient from the scalar parameter P by means of a function constituted by a linear combination of one or more exponentials of the form $\exp(a+bP+cP^{-1})$, where the coefficients a, b, and c may vary from one exponential to another.

In another aspect of the invention, a polarized lightwave reflectometry method is provided comprising in succession at least: a step of sending a plurality of mutually distinct polarized light signals into an optical fiber to be tested; a polarization-sensitive step of detecting the traces obtained by the light signals back-scattering; a step of extracting a common scalar parameter from each of the traces, the parameter being representative of polarization mode dispersion; and a step of estimating the polarization mode dispersion coefficient from the scalar parameters; the polarized light signals being sufficiently mutually distinct for the polarization mode dispersion coefficient to remain independent of any rotation of polarization in the optical fiber to be tested.

In another aspect of the invention, a polarized lightwave reflectometry method is provided comprising in succession at least: a step of sending a plurality of mutually distinct polarized light signals into an optical fiber to be tested; a polarization-sensitive step of detecting the traces obtained by the light signals back-scattering; and a step of estimating the polarization mode dispersion coefficient from the traces; the polarized light signals being sufficiently mutually distinct for the polarization mode dispersion coefficient to remain independent of any rotation of polarization in the optical fiber to be tested.

In another aspect of the invention, a polarized lightwave reflectometry method is provided comprising in succession at least: a step of sending at least one polarized light signal into an optical fiber to be tested; a polarization-sensitive step of detecting the trace obtained by the light signal back-scattering; a step of normalizing the trace; a step of computing the standard deviation of the normalized trace over at least a portion of the optical fiber to be tested, the result being referred to as the relative noise of the trace; and a step of estimating the polarization mode dispersion coefficient from the relative noise of the or each trace.

The invention will be better understood and other features and advantages will appear on reading the following description and the accompanying drawings, given as examples, in which:

BRIEF DESCRIPTION OF THE DRAWINGS

FIG. 1 is a diagram of an example of a system of the invention;

FIG. 2 is a diagram showing an example trace acquired from the OTDR of FIG. 1;

FIG. 3 is a diagram showing an example trace obtained by back-scattering;

FIG. 4 is a diagram showing an example normalized trace; and

FIG. 5 is a diagram showing an example of a function used during the step of estimating the polarization mode dispersion coefficient.

DETAILED DESCRIPTION OF THE INVENTION

The invention is described below in greater detail for one of its aspects. In a preferred aspect of the invention, the polarized lightwave reflectometry method is applied to an optical fiber to be tested whose polarization mode dispersion coefficient is to be determined, in particular both for verifying the uniformity of polarization mode dispersion in the optical fiber under test, and secondly for optionally selecting good segments of the optical fiber, i.e. optical fiber segments having a low polarization mode dispersion coefficient. The method includes a step of sending a plurality of linearly polarized light signals into the optical fiber to be tested, preferably two such signals. The light signals present a determined mutual angular offset so that the overall relative noise remains independent of any rotation of polarization in the optical fiber under test. The representations of the light signals on the Poincarre sphere are independent of one another, thus ensuring a constant value for overall relative noise, thereby making the accuracy of the estimate for the polarization mode dispersion coefficient independent of any rotation of polarization to which the light signals may be subjected during their go-and-return travel along the optical fiber under test. On returning, the light signals are detected. The step of detecting the traces obtained by the light signals back-scattering is sensitive to polarization, i.e. for example, light signals that have passed through a polarizer in the go direction also pass through it on return. Once acquired, each trace is normalized so as to make it independent of the different amounts of attenuation to which the signal is subjected along the optical fiber under test depending on the positions of the back-scattering, thus making it possible to ignore loss as a function of the length of optical fiber along which the back-scattered signal has traveled in the go-and-return directions. Then, for each of the traces, over a portion of the optical fiber under test when estimating polarization mode dispersion locally and over the entire optical fiber under test when estimating overall polarization mode dispersion, the standard deviation of the normalized trace is computed, this standard deviation being referred to as the "relative noise" of the trace. Thereafter, a weighted averaging type function is applied to the relative noise of each of these traces, giving the same weight to the relative noise of each of said traces, said average being referred to as the "overall relative noise". Finally, an estimation step determines the polarization mode dispersion coefficient on the basis of the overall relative noise by means of a function of the type having one scalar input and one scalar output, i.e. the overall relative noise which is a simple scalar value is input to said function and said function outputs a value for the polarization mode dispersion coefficient, which value is likewise a simple scalar value. The method of the invention has the advantage of being simple in various aspects, in particular concerning the parameters that are handled, it reduces the information contained in a trace to a single scalar parameter without significant degradation, and so far as the light source used is concerned, there is no need for it to generate a light pulse that is very fine as is necessary, in particular, in one of the prior art documents.

The method of the invention is quantitative, giving good accuracy over a range extending from about 0.01 ps/km$^{1/2}$ to 0.2 ps/km$^{1/2}$, since using a standard OTDR apparatus in the system of the invention does not present enough sensitivity to investigate a broader range. Nevertheless, in practice this range is very broad insofar as optical fibers presenting a polarization mode dispersion coefficient below the bottom end of said range can be considered as being excellent, whereas optical fibers presenting a polarization mode dispersion coefficient above the top end of said range can be considered as being bad. Once an optical fiber has been diagnosed as being excellent (the most severe specifications are satisfied) or bad (the least severe specifications are not satisfied) accuracy is unnecessary, whereas accuracy continues to be required for intermediate cases in which it is necessary to verify whether such and such a specification is satisfied or not. For a long time, the value and the uniformity of the polarization mode dispersion coefficient have been factors that are limiting on the quality of optical fibers and have constituted a "lock" that the quantitative polarized lightwave reflectometry method of the invention "unlocks". The ability of the system of the invention to implement the method of the invention while using a standard OTDR apparatus makes it particularly attractive in terms of cost. This also makes it possible simultaneously to perform conventional OTDR measurements, relating in particular to length, defects, and attenuation.

FIG. 1 is a diagram of an example of a system of the invention for implementing the method of the invention. Endpieces fitted with connectors are referenced EC and segments of optical fiber between such endpieces are referenced FO. The system also comprises in series: an optical reflectometer 1 which is a standard OTDR device; a polarization controller 2; and a reference optical fiber 3. The system further comprises a processor device 5 connected to the OTDR device 1. Since a standard OTDR device 1 gives only a trace that has been processed logarithmically, the processor device 5 is used in particular to restore the original trace which is of exponential appearance. The standard OTDR device 1 has a light pulse source operating at a wavelength of about 1550 nanometers (nm), a coupler, a detector, and processor means, but it is conventional and commercially available from numerous suppliers. The polarization controller 2 is constituted either by a linear polarizer associated with a rotary halfwave plate if the OTDR device 1 has a light source which is polarized, or else a rotary polarizer if the OTDR device 1 has a light source which is not polarized. The reference optical fiber 3 is a leader optical fiber whose free end is designed to be connected to an optical fiber 4 that is to be tested and does not belong to the system proper. Said free end therefore preferably possesses an endpiece fitted with a connector. The processor device 5 is designed to cooperate with the elements 1 to 4 to enable the polarized lightwave reflectometry method of the invention to be implemented.

The reference optical fiber 3, is not only a leader optical fiber but it also constitutes an internal standard for estimating the polarization mode dispersion coefficient, and for this purpose both the length and the polarization mode dispersion coefficient of the leader optical fiber are known and are used by the system of the invention. In order to present a trace which is as uniform and as usable as possible, the reference optical fiber 3 presents polarization mode dispersion which is preferably constant and uniform. The polarization mode dispersion of the reference optical fiber 3 preferably lies in the range 0.04 ps/km$^{1/2}$ to 0.06 ps/km$^{1/2}$, e.g. 0.05 ps/km$^{1/2}$. It is advantageous for the reference optical fiber 3 to be of the same type as the optical fibers under test, but although that is possible it would require a variety of types of reference optical fiber 3 to be available. Advantageously, the reference optical fiber 3 is of a length lying in the range 2 km to 4 km, e.g. 3 km. The reference optical fiber 3 may also be used in systems for implementing a polarized lightwave reflectometry method other than that of the invention, and it may also be used for implementing methods of polarized lightwave reflectometry other than that of the invention.

The two light signals are sent in succession by the OTDR device 1 through the polarization controller 2 so as to travel along the reference optical fiber 3 and the fiber under test 4. Along the optical fibers, the light signals are back-scattered and the back-scattered light returns towards the OTDR device and passes through the polarization controller 2. The light signals are linearly polarized and the angular offset between them is sufficiently close to 45 degrees for the estimated polarization mode dispersion coefficient to remain independent of any rotation of polarization in the optical fiber under test. The closer their angular offset to 45 degrees the better this is achieved, however a value that is slightly different will not excessively degrade the resulting accuracy in certain applications and is acceptable.

FIG. 2 is a diagram of an example of a trace acquired by the FIG. 1 OTDR and processed by the processor device 5, obtained by back-scattering light from one of the light signals sent. The standard trace corresponding to the reference optical fiber 3 is referenced Tref. The trace corresponding to the optical fiber under test 4 is reference Tfut. In general, a standard OTDR delivers a curve that has been subjected to logarithmic processing. However, that trace as already processed by the processor device 5 is exponential in appearance (because of attenuation as a function of distance along said optical fiber), but this does not show up if the trace is plotted for a distance that is too short. The intensity of the back-scattered light signal is plotted up the ordinate and is expressed in millivolts (mV) while distance from the OTDR device 1 is plotted along the abscissa, said distance between expressed in meters (m).

FIG. 3 is a diagram of an example of a trace obtained by back-scattering, whereas FIG. 4 is a diagram showing an example of a normalized trace. Curve C1 is of exponential appearance and represents the trace obtained by back-scattering one of the light signals. Curve C2 shows the best-fit exponential of the curve C1. Curve S of average value zero represents the normalized trace. Starting from the trace C1 of exponential appearance, the normalization step consists firstly in determining the curve C2 which is the best-fit exponential of C1, and secondly in determining the normalized trace S=(C1−C2)/C2. The step of computing the standard deviation of the normalized trace S is performed using the following formula:

$$\sqrt{\frac{1}{L}\int_0^L S^2\, dl}$$

where L is the length of the optical fiber portion under test 4. In FIGS. 3 and 4, the amplitude A of the signal up the ordinate is expressed as a function of the distance d of back-scattering along the optical fiber 4 under test. The overall relative noise is computed by means of a weighted average type function which can be, for example, either the arithmetic mean, the geometric mean, the harmonic mean, or the square root of the sum of the squares. In the advantageous case of using a function of the arithmetic mean type, the relative noise of one of the traces is written BR(0°) and that of the other trace is written BR(45°) to represent an offset of 45 degrees relative to the first trace. The overall relative noise BRG is then equal to:

$$BRG = \left[\frac{BR(0°) + BR(45°)}{2}\right]$$

The polarization mode dispersion coefficient written cPMD is determined on the basis of this overall relative noise BRG.

Preferably, the function used in the estimation step is a function made up of a linear combination of one or more exponentials of the form exp(a+bP+cP$^{-1}$), where the coefficients a, b, and c are fixed for each exponential, but may vary from one exponential to another. The function of the estimation step is preferably of the form:

$$cPMD = \exp\left(A + \frac{B}{BRG}\right)$$

where BRG is the overall relative noise, A is a fixed coefficient lying in the range −6 to −3, and B is a fixed coefficient lying in the range 0.001 to 0.2. By way of example, A can be −4.365 and B can be 0.06176, which corresponds to the curve CR shown in FIG. 5.

FIG. 5 is a diagram showing an example of a function used in the step of estimating the polarization mode dispersion coefficient. The polarization mode dispersion coefficient cPMD is plotted up the ordinate and is expressed in ps/km$^{1/2}$. Overall relative noise BRG is plotted along the abscissa and is a pure number without units. The curve CR is determined from a set of standard fibers FE represented by black lozenges. The curves LP represent the accuracy limits of the model.

Another function for the estimation step can be the following, for example:

$$cPMD = \exp\left(A + \frac{B}{BRG}\right) + A1\exp\left(\frac{BRG}{B1}\right)$$

where A is 0.4155 and B is −0.01286, with A1 being 0.04596 and B1 being −0.1970. Other functions, whether based on exponentials or otherwise, could also be used.

The invention claimed is:

1. A polarized lightwave reflectometry method comprising at least the following in succession:
   a step of sending a plurality of linearly polarized light signals into an optical fiber to be tested;
   a polarization-sensitive step of detecting the traces obtained by the light signals back-scattering;
   a step of normalizing each of the traces;
   a step, for each of the traces, of computing over at least a portion of the optical fiber to be tested, the standard deviation of the normalized trace, the result being referred to as the relative noise of the trace;
   a step of computation applying a weighted average type function to the relative noise of the various traces, giving the same weight in the weighted average type function to the noise from each of the various traces, the result being referred to as an overall relative noise; and
   a step of estimating the polarization mode dispersion coefficient from the overall relative noise by means of a function having one scalar input and one scalar output;
   the annular offset between the linearly polarized light signals being determined in such a manner that the overall relative noise remains independent of any rotation of polarization in the optical fiber to be tested.

2. A polarized lightwave reflectometry method according to claim 1, wherein:
   the light signals are two in number; and
   the angular offset between the two linearly polarized light signals is sufficiently close 45 degrees for the estimated polarization mode dispersion coefficient to remain independent of any rotation of polarization in the optical fiber to be tested.

3. A polarized lightwave reflectometry method according to claim 2, wherein the weighted average type function is whether the arithmetic mean, or the geometric mean, or the square root of the sump of the squares.

4. A polarized lightwave reflectometry method according to claim 2, wherein the normalization step consists, starting from the trace C1 of exponential appearance, firstly in determining the best-fit exponential C2 of C1, and secondly in determining the normalized trace S, where:

$S=(C1-C2)/C2$.

5. A polarized lightwave reflectometry method according to claim 4, wherein the standard deviation of the normalized trace is computed using the following formula:

$$\sqrt{\frac{1}{L}\int_0^L S^2\, dl}$$

where L is the length of the portion of optical fiber to be tested.

6. A polarized lightwave reflectometry method according to claim 1, wherein the function of the estimation step is a function constituted by a linear combination of one or more exponentials of the form exp (a+bP+cP$^{-1}$), the coefficients a, b, and c being fixed for each exponential, but possibly varying from one exponential to another.

7. A polarized lightwave reflectometry method according to claim 6, wherein the function of the estimation step is:

$$\exp\left(A + \frac{B}{BRG}\right)$$

where BRG is overall relative noise, A is a fixed coefficient lying in the range −6 to −3, and B is a fixed coefficient lying in the range 0.0001 to 0.2.

8. A polarized lightwave reflectometry method according to claim 1, wherein said method is quantitative over a range extending from 0.01 ps/km$^{1/2}$ to 0.2ps/km$^{1/2}$.

9. A polarized lightwave reflectometry method comprising at least the following in succession:
   a step of sending a plurality of mutually distinct polarized light signals into an optical fiber to be tested;
   a polarization-sensitive step of detecting the traces obtained by the light signals back-scattering;
   a step of normalizing each of the traces;
   a step, for each of the traces, of computing over at least a portion of the optical fiber to be tested, the standard deviation of the normalized trace, the result being referred to as the relative noise of the trace; and
   a step of estimating the polarization mode dispersion coefficient from the relative noise of the traces;

the polarized light signals being sufficiently distinct from one another for the polarization mode dispersion coefficient to remain independent of any rotation of polarization in the optical fiber to be tested.

10. A polarized lightwave reflectometry method comprising at least the following in succession:
   a step of sending two linearly polarized light signals into an optical fiber to be tested;
   a polarization-sensitive step of detecting the traces obtained by the light signals back-scattering; and
   a step of estimating the polarization mode dispersion coefficient from the traces;
   the annular offset between the two linearly polarized light signals being sufficiently close to 45 degrees for the estimated polarization mode dispersion coefficient to remain independent of any rotation of polarization in the optical fiber to be tested.

11. A polarized lightwave reflectometry method comprising at least the following in succession:
   a step of sending at least one polarized light signal into an optical fiber to be tested;
   a polarization-sensitive step of detecting the trace obtained by the light signal back-scattering;
   a step of calculating a scalar parameter P obtained from the trace or traces; and
   a step of estimating the polarization mode dispersion coefficient from the scalar parameter P by means of a function constituted by a linear combination of one or more exponentials of the form $\exp(a+bP+cP^{-1})$, where the coefficients a b and c may vary from one exponential to another.

12. A polarized lightwave reflectometry method comprising at least the following in succession:
   a step of sending a plurality of mutually distinct polarized light signals into an optical fiber to be tested;
   a polarization-sensitive step of detecting the traces obtained the light signals by back-scattering;
   a step of extracting a common scalar parameter from each of the traces, the parameter being representative of polarization mode dispersion; and
   a step of estimating the polarization mode dispersion coefficient from the scalar parameters;
   the polarized light signals being sufficiently mutually distinct for the polarization mode dispersion coefficient to remain independent of any rotation of polarization in the optical fiber to be tested.

13. A polarized lightwave reflectometry method according to claim 12, wherein the light signals are two in number.

14. A polarized lightwave reflectometry method comprising at least the following in succession:
   a step of sending a plurality of mutually distinct polarized light signals into an optical fiber to be tested;
   a polarization-sensitive step of detecting the traces obtained by the light signals back-scattering; and
   a step of estimating the polarization mode dispersion coefficient from the traces;
   the polarized light signals being sufficiently mutually distinct for the polarization mode dispersion coefficient to remain independent of any rotation of polarization in the optical fiber to be tested.

15. A polarized lightwave reflectometry method comprising at least the following in succession:
   a step of sending at least one polarized light signal into an optical fiber to be tested;
   a polarization-sensitive step of detecting each trace obtained by the at least one polarized light signal back-scattering;
   a step of normalizing the trace;
   a step of computing the standard deviation of the normalized trace over at least a portion of the optical fiber to be tested, the result being referred to as the relative noise of the trace; and
   a step of estimating the polarization mode dispersion coefficient from the relative noise of the trace or each trace.

* * * * *